(12) United States Patent
Kang (10) Patent No.: US 12,504,093 B2
(45) Date of Patent: Dec. 23, 2025

(54) NOISE REDUCTION MEMBER AND SOLENOID VALVE FOR BRAKE SYSTEM WITH THE SAME

(71) Applicant: HL MANDO CORPORATION, Gyeonggi-do (KR)

(72) Inventor: Kiwon Kang, Gyeonggi-do (KR)

(73) Assignee: HL MANDO CORPORATION, Gyeonggi-do (KR)

( * ) Notice: Subject to any disclaimer, the term of this patent is extended or adjusted under 35 U.S.C. 154(b) by 92 days.

(21) Appl. No.: 18/239,025

(22) Filed: Aug. 28, 2023

(65) Prior Publication Data

US 2024/0295246 A1 Sep. 5, 2024

(30) Foreign Application Priority Data

Mar. 2, 2023 (KR) ........................ 10-2023-0027695

(51) Int. Cl.
| | |
|---|---|
| *F16K 31/06* | (2006.01) |
| *B60T 15/02* | (2006.01) |
| *F16K 47/00* | (2006.01) |
| F16D 65/00 | (2006.01) |

(52) U.S. Cl.
CPC ........ *F16K 31/0696* (2013.01); *B60T 15/028* (2013.01); *F16K 31/0655* (2013.01); *F16K 47/012* (2021.08); F16D 65/0006 (2013.01)

(58) Field of Classification Search
USPC .............................................. 251/64, 129.15
See application file for complete search history.

(56) References Cited

U.S. PATENT DOCUMENTS

| | | | | |
|---|---|---|---|---|
| 2,619,116 A | * | 11/1952 | Ralston | ............... F16K 31/0658 |
| | | | | 251/129.1 |
| 3,552,429 A | * | 1/1971 | Dickinson | ............... F16F 9/348 |
| | | | | 251/40 |
| 4,569,504 A | * | 2/1986 | Doyle | ................. F16K 31/0675 |
| | | | | 335/279 |

(Continued)

FOREIGN PATENT DOCUMENTS

| | | |
|---|---|---|
| DE | 10 2004 012 526 | 10/2004 |
| DE | 10 2009 055 365 | 6/2011 |

(Continued)

OTHER PUBLICATIONS

Office Action dated Aug. 26, 2024 for German Patent Application No. 10 2023 206 615.7 and its English translation provided by Applicant's foreign counsel.

*Primary Examiner* — Matthew W Jellett
(74) *Attorney, Agent, or Firm* — WOMBLE BOND DICKINSON (US) LLP (57) ABSTRACT

The present disclosure relates to a noise reduction member and a solenoid valve for a brake system with the same, and a noise reduction member according to an embodiment of the present disclosure is interposed between a sleeve including a cylindrical shape and an armature provided in the sleeve so as to be movable upward or downward, reduces noise that occurs in the event of a collision between the sleeve and the armature, and includes a support portion accommodated and supported in the armature, and a damper portion having a circular plate shape and protruding and extending from the support portion toward the sleeve.

19 Claims, 10 Drawing Sheets

(56) References Cited

U.S. PATENT DOCUMENTS

| | | | | |
|---|---|---|---|---|
| 5,033,505 A * | 7/1991 | Eidsmore | F16K 31/086 |
| | | | 137/906 |
| 6,065,734 A * | 5/2000 | Tackett | F16K 31/0693 |
| | | | 303/119.2 |
| 6,267,350 B1 * | 7/2001 | Slawinski | F02M 51/0671 |
| | | | 251/64 |
| 6,595,485 B2 * | 7/2003 | Burrola | F16K 31/0696 |
| | | | 251/64 |
| 6,644,623 B1 * | 11/2003 | Voss | B60T 8/363 |
| | | | 251/129.01 |
| 6,830,232 B2 * | 12/2004 | Burrola | F02M 25/0836 |
| | | | 251/64 |
| 6,955,337 B2 * | 10/2005 | Weber | F16K 31/0651 |
| | | | 251/64 |
| 7,040,594 B2 * | 5/2006 | Hironaka | B60T 8/363 |
| | | | 251/50 |
| 7,108,242 B2 * | 9/2006 | Goossens | B60T 8/363 |
| | | | 29/523 |
| 7,243,899 B2 * | 7/2007 | Acar | B60T 8/363 |
| | | | 335/279 |
| 7,422,193 B2 * | 9/2008 | Sisk | F16K 31/0696 |
| | | | 251/64 |
| 8,540,212 B2 * | 9/2013 | Speer | F16K 31/0665 |
| | | | 251/64 |
| 8,590,859 B2 * | 11/2013 | Kurz | F16K 31/0665 |
| | | | 251/64 |
| 8,672,292 B2 * | 3/2014 | Leiser | F16K 31/0648 |
| | | | 251/64 |
| 8,814,135 B2 * | 8/2014 | Ams | F16K 31/0655 |
| | | | 335/277 |
| 8,870,160 B2 * | 10/2014 | Ambrosi | B60T 8/363 |
| | | | 251/64 |
| 10,993,546 B2 * | 5/2021 | Shakal | A47C 27/083 |
| 11,110,905 B2 * | 9/2021 | Jeon | B60T 15/043 |
| 11,313,488 B2 * | 4/2022 | Lee | B60T 8/363 |
| 2005/0056800 A1 * | 3/2005 | Modien | F16K 31/0651 |
| | | | 251/64 |
| 2008/0272208 A1 * | 11/2008 | Anderson | B65D 83/262 |
| | | | 239/302 |
| 2015/0130265 A1 * | 5/2015 | Leventhal | B60T 13/662 |
| | | | 251/48 |
| 2019/0186651 A1 * | 6/2019 | Pellmann | F16K 31/0655 |
| 2022/0221080 A1 * | 7/2022 | Shioi | F16K 31/0696 |

FOREIGN PATENT DOCUMENTS

| | | |
|---|---|---|
| DE | 10 2014 219 117 | 3/2016 |
| DE | 10 2016 202 823 | 9/2016 |

* cited by examiner

NOISE REDUCTION MEMBER AND SOLENOID VALVE FOR BRAKE SYSTEM WITH THE SAME

CROSS-REFERENCE TO RELATED APPLICATIONS

This application claims benefit and priority to Korean Patent Application No. 10-2023-0027695, filed on Mar. 2, 2023, with the Korean Intellectual Property Office, the disclosure of which is incorporated herein in its entirety by reference.

TECHNICAL FIELD

The present disclosure relates to a noise reduction member and a solenoid valve for a brake system with the same, and more particularly, to a noise reduction member capable of reducing noise and vibration when a solenoid valve operates, and a solenoid valve for a brake system with the same.

BACKGROUND

In general, an anti-lock brake system for a vehicle detects a slip of a wheel and controls braking pressure to be applied to the wheel, thereby preventing the wheel from being locked during a braking process. Therefore, the anti-lock brake system allows the wheel to be safely braked while maintaining directionality without slipping during the braking process.

Such a brake system has a plurality of solenoid valves that opens or closes flow paths of a brake hydraulic line to control the braking pressure. The solenoid valves include a normal open-type solenoid valve that is kept in an opened state at ordinary times, and a normal close-type solenoid valve that is kept in a closed state at ordinary times.

The normal open-type solenoid valve in the related art is installed on a modulator block to increase directness. A valve bore is machined in the modulator block so that the valve may be installed. The valve bore is connected to an inner flow path formed in the modulator block, and a valve core is inserted and installed into the valve bore.

A cylindrical sleeve is connected to one end of the valve core so that an armature, which is installed in a hollow portion of the cylindrical sleeve, may move upward or downward. Further, a plunger is provided on one end of the armature to open or close an orifice of a valve seat while moving upward or downward, and a restoring spring is installed between the plunger and the valve seat.

Meanwhile, the solenoid valve in the related art has a problem in which frictional noise occurs when the valve operates, and a driver may recognize the frictional noise. For example, when the armature of the solenoid valve moves upward or downward, frictional noise occurs when an upper surface of the armature collides with the sleeve that accommodates the armature. There is a problem in that excessive noise occurs.

SUMMARY

The present disclosure has been made in an effort to provide a noise reduction member capable of reducing the occurrence of noise, and a solenoid valve for a brake system with the same.

According to an embodiment of the present disclosure, a noise reduction member is interposed between a sleeve including a cylindrical shape and an armature provided in the sleeve so as to be movable upward or downward, reduces noise that occurs in the event of a collision between the sleeve and the armature, and includes: a support portion accommodated and supported in the armature; and a damper portion having a circular plate shape and protruding and extending from the support portion toward the sleeve.

The noise reduction member may be configured such that an edge of the damper portion having the circular plate shape comes into contact with the sleeve when the armature moves upward.

A discharge flow path may be formed in one surface of the damper portion, which faces the sleeve, so that a working fluid in a space between the damper portion and the sleeve is discharged when the damper portion and the sleeve come into contact with each other.

A central region, which is disposed inside the edge of the damper portion that comes into contact with the sleeve when the armature moves upward, may be recessed in a direction away from the sleeve.

The working fluid present in the space between the damper portion and the sleeve may be discharged between the edge of the damper portion and the sleeve when the armature moves upward, and a buffer effect may increase when flow path resistance increases as an interval between the edge of the damper portion and the sleeve decreases.

The edge of the damper portion may be spaced apart from the armature based on a state in which the armature is moved downward.

The edge of the damper portion, which is spaced apart from the armature, may come into contact with the armature by being deformed by a collision between the edge of the damper portion and the sleeve when the armature moves upward.

The noise reduction member may be made of polyether ether ketone (PEEK).

According to another embodiment of the present disclosure, a solenoid valve for a brake system includes: a valve core having an inlet and an outlet; a sleeve including a cylindrical shape coupled to one side of the valve core; an armature provided in the sleeve so as to be movable upward or downward; a plunger provided in the valve core and configured to open or close an inlet of the valve core in accordance with an upward or downward movement of the armature; and a noise reduction member accommodated in the armature and configured to reduce noise that occurs because of impact by the sleeve when the armature moves upward or downward. Further, the noise reduction member may include: a support portion accommodated and supported in the armature; and a damper portion having a circular plate shape and protruding and extending from the support portion toward the sleeve.

The noise reduction member may be configured such that an edge of the damper portion having the circular plate shape comes into contact with the sleeve when the armature moves upward.

One surface of the sleeve, which faces the armature based on a direction in which the armature moves upward or downward, may be formed in a shape convexly curved in a direction opposite to a direction in which the sleeve faces the armature.

A discharge flow path may be formed in one surface of the damper portion, which faces the sleeve, so that a working fluid in a space between the damper portion and the sleeve is discharged when the damper portion and the sleeve come into contact with each other.

A central region, which is disposed inside the edge of the damper portion that comes into contact with the sleeve when the armature moves upward, may be recessed in a direction away from the sleeve, the working fluid present in the space between the damper portion and the sleeve may be discharged between the edge of the damper portion and the sleeve when the armature moves upward, and a buffer effect may increase when flow path resistance increases as an interval between the edge of the damper portion and the sleeve decreases.

The edge of the damper portion may be spaced apart from the armature based on a state in which the armature is moved downward, and the edge of the damper portion, which is spaced apart from the armature, may come into contact with the armature by being deformed by a collision between the edge of the damper portion and the sleeve when the armature moves upward.

The noise reduction member may be made of polyether ether ketone (PEEK).

A noise reduction member accommodation groove may be formed at one end of the armature to accommodate the noise reduction member, and the support portion of the noise reduction member may be accommodated in the noise reduction member accommodation groove.

The damper portion of the noise reduction member may be spaced apart from the sleeve in a state in which the armature is maximally moved downward.

The solenoid valve for a brake system may further include: a valve seat installed in the inlet of the valve core and having an orifice, in which the plunger opens or closes the orifice of the valve seat.

The solenoid valve for a brake system may further include a restoring spring installed in the valve core and configured to elastically press the plunger in a direction in which the plunger opens the inlet of the valve core.

According to the embodiment of the present disclosure, the noise reduction member and the solenoid valve for a brake system with the same may effectively reduce the occurrence of noise.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

In the following detailed description, reference is made to the accompanying drawing, which forms a part hereof. The illustrative embodiments described in the detailed description, drawing, and claims are not meant to be limiting. Other embodiments may be utilized, and other changes may be made, without departing from the spirit or scope of the subject matter presented here.

Hereinafter, embodiments of the present disclosure will be described in detail with reference to the accompanying drawings so that those with ordinary skill in the art to which the present disclosure pertains may easily carry out the embodiments. The present disclosure may be implemented in various different ways, and is not limited to the embodiments described herein.

The constituent elements having the same configurations in the several embodiments will be assigned with the same reference numerals and described representatively in a first embodiment, and only the constituent elements, which are different from the constituent elements according to the first embodiment, will be described in other embodiments.

It is noted that the drawings are schematic, and are not illustrated based on actual scales. Relative dimensions and proportions of parts illustrated in the drawings are exaggerated or reduced in size for the purpose of clarity and convenience in the drawings, and any dimension is just illustrative but not restrictive. The same reference numerals designate the same structures, elements or components illustrated in two or more drawings in order to exhibit similar characteristics.

Embodiments of the present disclosure illustrate ideal embodiments of the present disclosure in detail. As a result, various modifications of the drawings are expected. Therefore, the embodiments are not limited to specific forms in regions illustrated in the drawings, and for example, include modifications of forms by the manufacture thereof.

Unless otherwise defined, all technical and scientific terms used in the present specification have meanings generally understood by those skilled in the art to which the present disclosure pertains. All terms used in the present specification are selected for the purpose of more clearly explaining the present disclosure but not selected to restrict the scope of the present disclosure.

The expressions "include," "provided with," "have" and the like used in the present specification should be understood as open-ended terms connoting the possibility of inclusion of other embodiments unless otherwise mentioned in a phrase or sentence including the expressions.

A singular expression can include the meaning of a plurality unless otherwise mentioned, and the same applies to a singular expression stated in the claims.

The terms "first," "second," and the like used in the present specification are used to identify a plurality of constituent elements from one another and are not intended to limit the order or importance of the relevant constituent elements.

Hereinafter, a noise reduction member 501 and a solenoid valve 101 for a brake system according to a first embodiment of the present disclosure will be described with reference to FIGS. 1 to 3.

Figure 1:
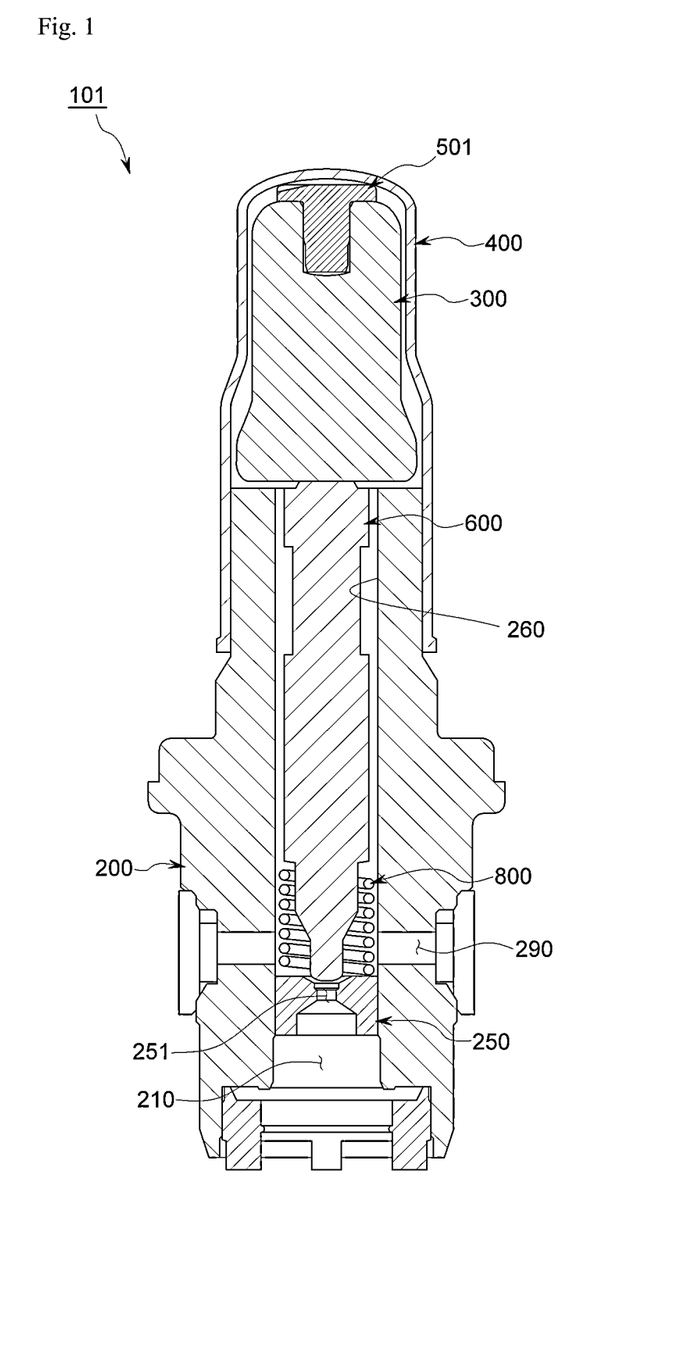
FIG. 1 is a cross-sectional view illustrating a noise reduction member and a solenoid valve for a brake system with the same according to a first embodiment of the present disclosure.

FIG. 1 exemplarily illustrates a normal open-type solenoid valve that is kept in an opened state at ordinary times among the solenoid valves 101 for a brake system.

Figure 2:
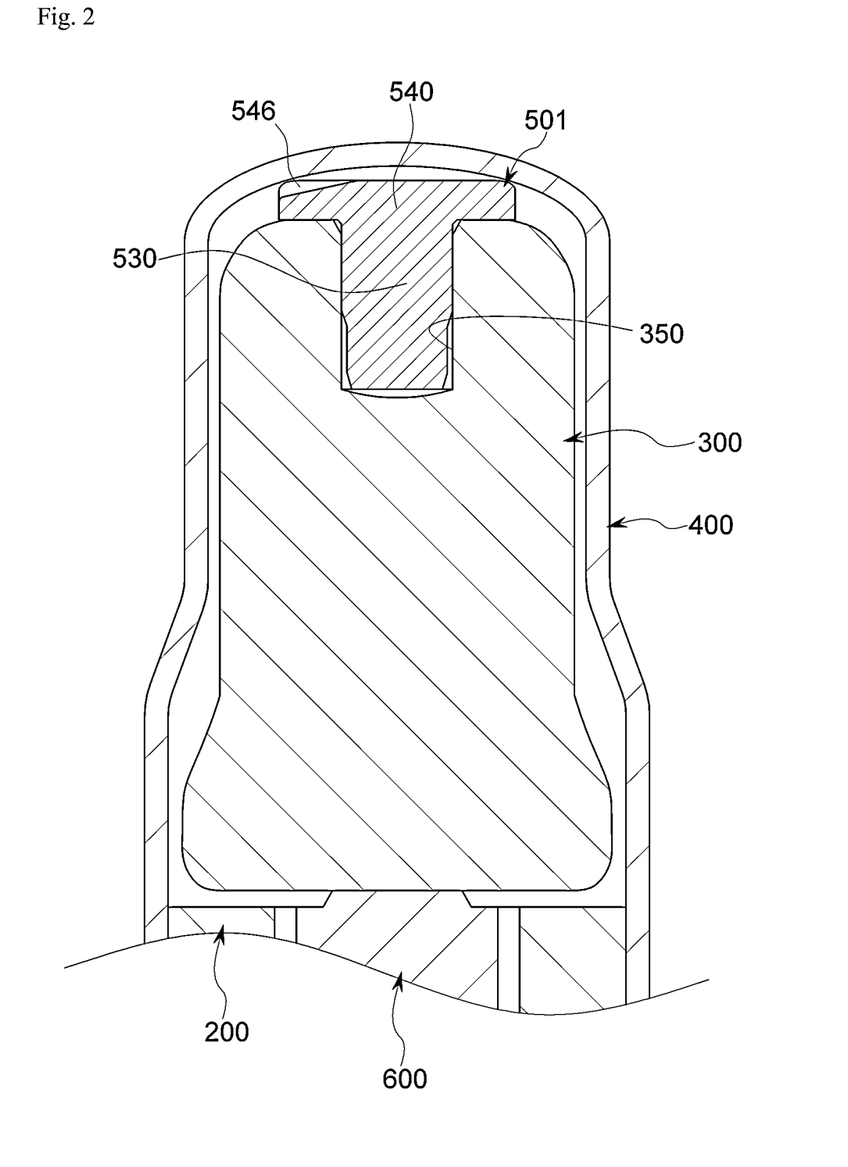
FIG. 2 is an enlarged cross-sectional view illustrating an armature and the noise reduction member in FIG. 1.
Figure 3:
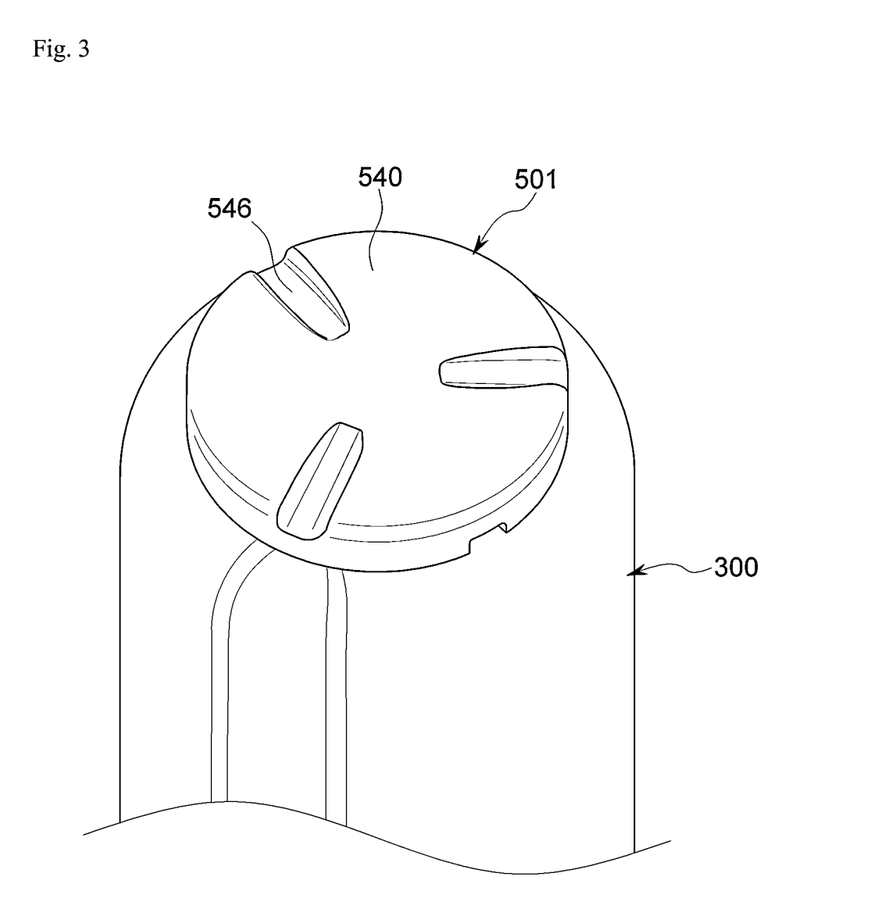
FIG. 3 is an enlarged perspective view illustrating the armature and the noise reduction member in FIG. 1.

As illustrated in FIGS. 1 to 3, the solenoid valve 101 for a brake system includes a valve core 200, a sleeve 400, an armature 300, a plunger 600, and the noise reduction member 501 according to the first embodiment of the present disclosure.

The solenoid valve 101 for a brake system may further include a valve seat 250 and a restoring spring 800.

An inlet 210 and an outlet 290 are formed in the valve core 200. Specifically, a longitudinal through-hole 260 may be formed at a center of the valve core 200, and the inlet 210 and the outlet 290 may be provided at a lower end of the valve core 200 to introduce and discharge a working fluid. Further, the valve core 200 may be a magnetic valve core.

Meanwhile, although not illustrated, the valve core 200 may be installed on a modulator block. A valve bore may be machined in the modulator block so that the valve core 200 may be installed. Further, the valve core 200 may be connected to an inner flow path formed in the modulator block when the valve core 200 is inserted and installed into the valve bore.

The valve seat 250 may be installed in the inlet 210 of the valve core 200 and have an orifice 251.

The sleeve 400 is connected to one side of the valve core 200. Specifically, the sleeve 400 may have a cylindrical shape and close one end of the valve core 200. The sleeve 400 may have a space in which the armature 300 to be described below is accommodated.

One surface of the sleeve 400, e.g., an upper surface of the sleeve 400, which faces the armature 300 based on a direction in which the armature 300 to be described below moves upward or downward, may be formed in a shape convexly curved in a direction opposite to the direction in which the sleeve 400 faces the armature 300.

The armature 300 is provided in the sleeve 400 so as to move upward or downward.

According to the first embodiment of the present disclosure, a noise reduction member accommodation groove 350 may be formed at one end of the armature 300 to accommodate the noise reduction member 501. In this case, one end of the armature 300, at which the noise reduction member accommodation groove 350 is formed, is opposite to the other end of the armature 300 that faces the plunger 600 to be described below.

The plunger 600 may be provided in the through-hole 260 formed in the valve core 200 and open or close the inlet 210 of the valve core 200 in accordance with the upward and downward movements of the armature 300. For example, the plunger 600 may open or close the orifice 251 of the valve seat 250 installed in the inlet 210 of the valve core 200. That is, when the plunger 600 is moved upward, the working fluid introduced into the inlet 210 of the valve core 200 may be discharged to the outlet 290. When the plunger 600 is moved downward, the plunger 600 closes the inlet 210 of the valve core 200 and blocks the movement of the working fluid.

Specifically, the plunger 600 may be installed in the through-hole 260 formed in the valve core 200 so as to be movable upward or downward in the longitudinal direction. One end of the plunger 600 is disposed adjacent to the valve seat 250 installed in the inlet 210 of the valve core 200, and the other end of the plunger 600 is disposed adjacent to the armature 300. In this case, the end of the plunger 600, which is adjacent to the valve seat 250, closes the orifice 251 of the valve seat 250 and blocks the flow of the working fluid when the plunger 600 is moved downward by the operation of the armature 300.

The restoring spring 800 may be installed in the valve core 200 and elastically press the plunger 600 in the direction in which the plunger 600 opens the inlet 210 of the valve core 200.

For example, the restoring spring 800 may be installed at the end of the plunger 600 that faces the valve seat 250. One end of the restoring spring 800 may be supported on the valve seat 250, and the other end of the restoring spring 800 may be supported in a state of being partially fitted with the end of the plunger 600. Further, at ordinary times, the restoring spring 800 opens the orifice 251 of the valve seat 250 by moving the plunger 600 and the armature 300 upward.

The noise reduction member 501 is accommodated in the armature 300 and reduces noise that occurs because of a collision with the sleeve 400 when the armature 300 moves upward or downward. For example, the noise reduction member 501 may be made of polyether ether ketone (PEEK).

Specifically, the noise reduction member 501 may include a support portion 530 accommodated and supported in the armature 300, and a damper portion 540 protruding and extending from the support portion 530 toward the sleeve 400 and having a circular plate shape. In this case, the support portion 530 of the noise reduction member 501 may be accommodated and supported in the noise reduction member accommodation groove 350 of the armature 300.

The noise reduction member 501 may be configured such that an edge of the damper portion 540 having a circular plate shape comes into contact with the sleeve 400 when the armature 300 moves upward. That is, when the sleeve 400 and the armature 300 approach each other as the armature 300 moves upward, the damper portion 540 of the noise reduction member 501 is interposed between the armature 300 and the sleeve 400 and suppresses the occurrence of noise and vibration due to a collision between the armature 300 and the sleeve 400.

The damper portion 540 of the noise reduction member 501 may be spaced apart from the sleeve 400 in a state in which the armature 300 is maximally moved downward.

For example, in case that the solenoid valve 101 for a brake system is a normal open-type solenoid valve that is kept in an opened state at ordinary times, the armature 300 is in a state of being moved upward by the restoring spring 800 at ordinary times. Therefore, the noise reduction member 501 is also in a state of being in contact with the sleeve 400 at ordinary times.

As described above, in the first embodiment of the present disclosure, the damper portion 540 of the noise reduction member 501 is formed in a circular plate shape, and the edge of the damper portion 540 comes into contact with the sleeve 400 when the noise reduction member 501 comes into contact with the sleeve 400, such that a contact area may increase in the event of the collision between the sleeve 400 and the noise reduction member 501, thereby further reducing the occurrence of noise.

In contrast, unlike the first embodiment of the present disclosure, when a center of the damper portion 540 of the noise reduction member 501 comes into contact with the sleeve 400, a contact area may be reduced as contact is implemented to be similar to point contact.

It has been ascertained from experiments that noise is reduced as the contact point becomes distant from a central axis, i.e., an upward/downward movement axis along which the armature 300 moves upward or downward when the noise reduction member 501 and the sleeve 400 come into contact with each other.

Therefore, according to the first embodiment of the present disclosure, the edge of the damper portion 540 having the circular plate shape of the noise reduction member 501 comes into contact with the sleeve 400, such that it is possible to obtain an effect of reducing noise by increasing a contact area as well as an effect of reducing noise by spacing the contact point between the damper portion 540 of the noise reduction member 501 and the sleeve 400 apart from the upward/downward movement axis.

A discharge flow path 546 may be formed in one surface of the damper portion 540 of the noise reduction member 501 that faces the sleeve 400 so that the working fluid present in the space between the damper portion 540 and the sleeve 400 is discharged when the damper portion 540 and the sleeve 400 come into contact with each other.

In the first embodiment of the present disclosure, the damper portion 540 of the noise reduction member 501 is formed in a circular plate shape, and an edge of the damper portion 540 of the noise reduction member 501 comes into contact with the sleeve 400. Therefore, when the sleeve and the edge of the damper portion of the noise reduction member become close to each other as the armature moves upward, the working fluid present between the sleeve 400 and the damper portion 540 of the noise reduction member 501 may be trapped in a gap and hardly moved. Therefore, when the discharge flow path 546 is formed in one surface of the damper portion 540 that faces the sleeve 400, the working fluid in the space between the sleeve 400 and the damper portion 540 of the noise reduction member 501 may be easily discharged.

With the above-mentioned configuration, the noise reduction member 501 and the solenoid valve 101 for a brake system with the same according to the first embodiment of the present disclosure may effectively reduce the occurrence of noise.

Specifically, when the armature 300 moves upward, the edge of the damper portion 540 having the circular plate shape of the noise reduction member 501 comes into contact with the sleeve 400, such that it is possible to obtain an effect of reducing noise by increasing a contact area as well as an effect of reducing noise by spacing the contact point between the damper portion 540 of the noise reduction member 501 and the sleeve 400 apart from the upward/downward movement axis.

Hereinafter, an operating state of the solenoid valve 101 for a brake system according to the first embodiment of the present disclosure will be described with reference to FIGS. 2 and 4.

Figure 4:
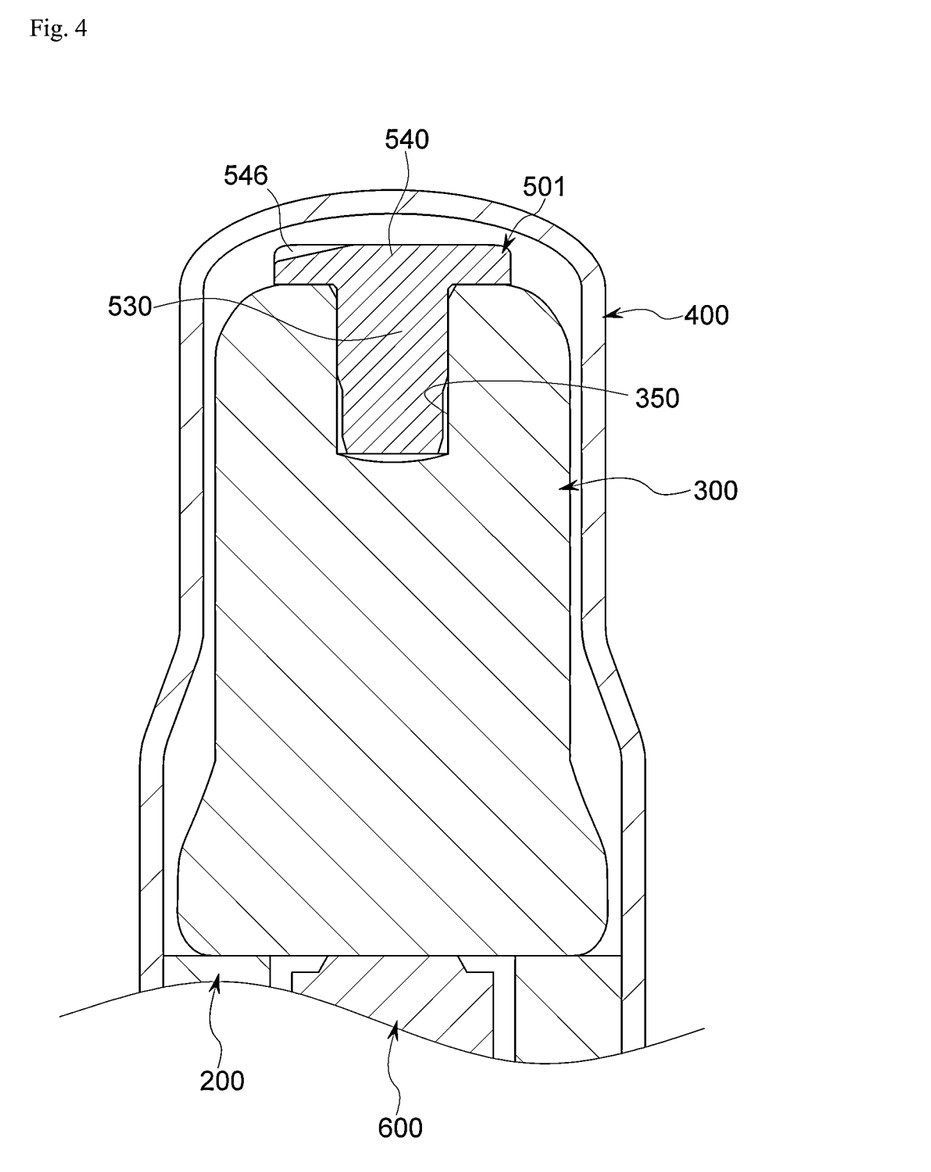
FIG. 4 is a cross-sectional view illustrating operating states of the armature and the noise reduction member in FIG. 1.

FIG. 2 illustrates a state in which the armature 300 is maximally moved upward, and FIG. 4 illustrates a state in which the armature 300 is maximally moved downward.

For example, in case that the solenoid valve 101 for a brake system is a normal open-type solenoid valve that is kept in an opened state at ordinary times, the armature 300 is in a state of being moved upward at ordinary times, as illustrated in FIG. 2.

As illustrated in FIG. 2, the damper portion 540 of the noise reduction member 501 is in contact with the sleeve 400 in a state in which the armature 300 is moved upward. As illustrated in FIG. 4, the damper portion 540 of the noise reduction member 501 is spaced apart from the sleeve 400 in a state in which the armature 300 is moved downward.

As illustrated in FIG. 4, when the armature 300 moves upward from the state in which the armature 300 is moved downward, the edge of the damper portion 540 of the noise reduction member 501 comes into contact with the sleeve 400, as illustrated in FIG. 2, thereby reducing noise and vibration.

In this case, the edge of the damper portion 540 having the circular plate shape of the noise reduction member 501 comes into contact with the sleeve 400, such that it is possible to obtain an effect of reducing noise by increasing a contact area as well as an effect of reducing noise by spacing the contact point between the damper portion 540 of the noise reduction member 501 and the sleeve 400 apart from the upward/downward movement axis.

As described above, the noise reduction member 501 and the solenoid valve 101 for a brake system with the same according to the first embodiment of the present disclosure may effectively reduce the occurrence of noise.

Hereinafter, a noise reduction member 502 and a solenoid valve 101 for a brake system according to a second embodiment of the present disclosure will be described with reference to FIGS. 5 to 7.

Figure 5:
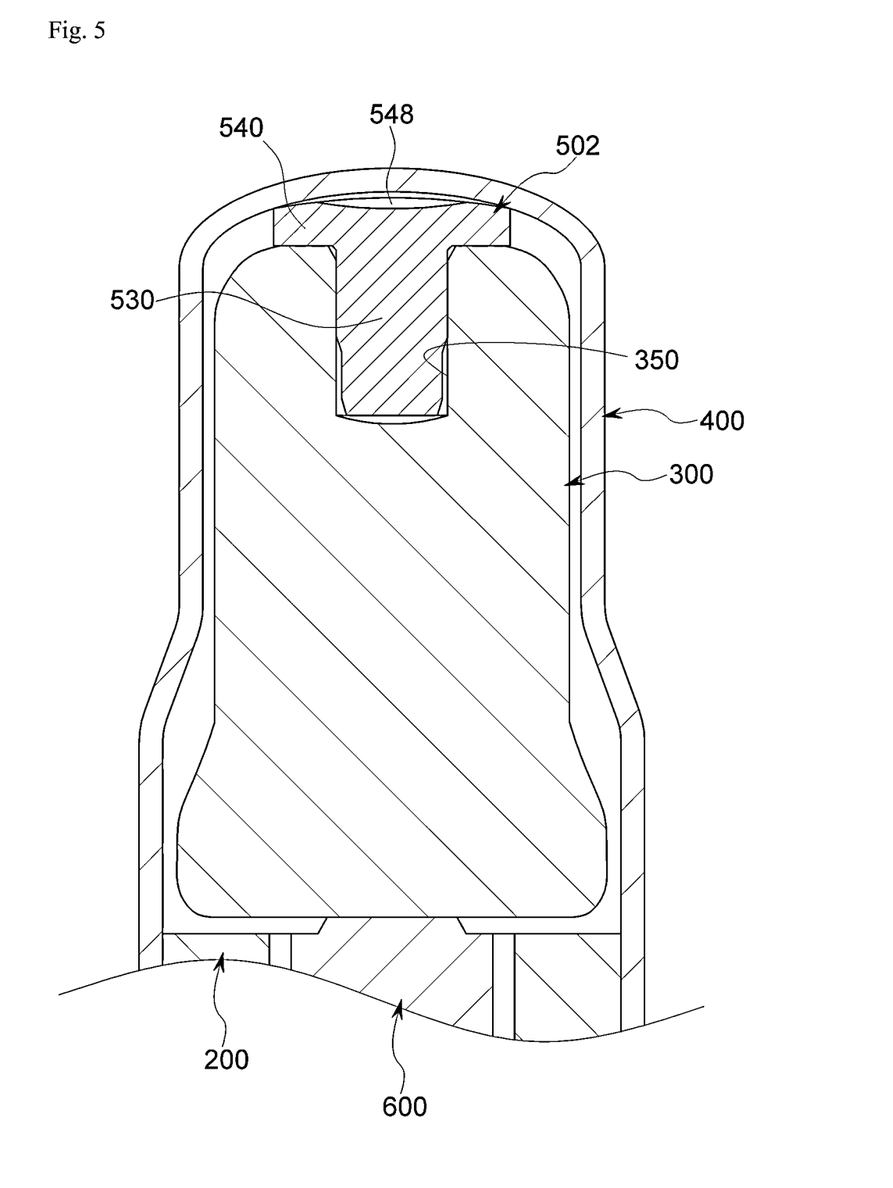
FIG. 5 is an enlarged cross-sectional view illustrating an armature, a noise reduction member, and a solenoid valve for a brake system with the same according to a second embodiment of the present disclosure.
Figure 6:
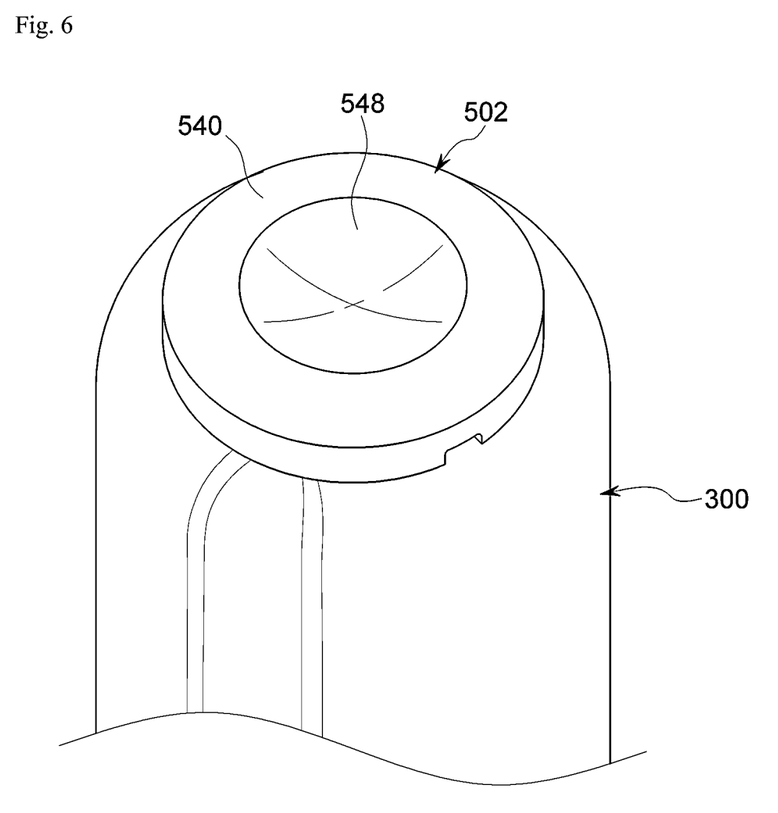
FIG. 6 is an enlarged perspective view illustrating the armature and the noise reduction member in FIG. 5.

As illustrated in FIGS. 5 and 6, in the second embodiment of the present disclosure, the edge of the damper portion 540 having the circular plate shape of the noise reduction member 502 comes into contact with the sleeve 400 when the armature 300 moves upward. A central region inside the edge of the damper portion 540, which comes into contact with the sleeve 400 when the armature 300 moves upward, may be recessed in a direction away from the sleeve 400. That is, the damper portion 540 having the circular plate shape may have a recessed region 548 formed at a center thereof.

Meanwhile, in the first embodiment, the discharge flow path 546 formed in one surface of the damper portion 540, which faces the sleeve 400, may be excluded.

Therefore, according to the second embodiment of the present disclosure, it is possible to obtain an additional effect of reducing noise and vibration as well as a noise and vibration reducing effect that may be obtained when the edge of the damper portion 540 having the circular plate shape of the noise reduction member 502 comes into contact with the sleeve 400.

Specifically, in the second embodiment of the present disclosure, the recessed region 548 formed at the center of the damper portion 540 of the noise reduction member 502 may be filled with the working fluid, the damper portion 540 may be formed in a circular plate shape, and the edge of the damper portion 540 may come into contact with the sleeve 400. Therefore, when the sleeve 400 and the edge of the damper portion 540 of the noise reduction member 502 become close to each other as the armature 300 moves upward, the working fluid present in the space between the sleeve 400 and the damper portion 540 of the noise reduction member 502 is discharged between the sleeve 400 and the edge of the damper portion 540. Therefore, a buffer effect increases as flow path resistance increases when an interval between the edge of the damper portion 540 and the sleeve 400 decreases.

In this case, the working fluid, which fills the recessed region 548 of the damper portion 540 of the noise reduction member 502, may further maximize the buffer effect.

With the above-mentioned configuration, the noise reduction member 502 and the solenoid valve 101 for a brake system with the same according to the second embodiment of the present disclosure may effectively reduce the occurrence of noise.

Specifically, when the armature 300 moves upward, the edge of the damper portion 540 having the circular plate shape of the noise reduction member 501 comes into contact with the sleeve 400, such that it is possible to obtain an effect of reducing noise by increasing a contact area as well as an effect of reducing noise by spacing the contact point between the damper portion 540 of the noise reduction member 501 and the sleeve 400 apart from the upward/downward movement axis. Further, it is possible to obtain the buffer effect further improved by flow path resistance that increases as the working fluid, which is present in the space between the sleeve 400 and the damper portion 540 of the noise reduction member 502 is discharged between the edge of the damper portion 540 and the sleeve 400.

Hereinafter, operating states of the noise reduction member 502 and the solenoid valve 101 for a brake system with the same according to the second embodiment of the present disclosure will be described with reference to FIGS. 5 and 7.

Figure 7:
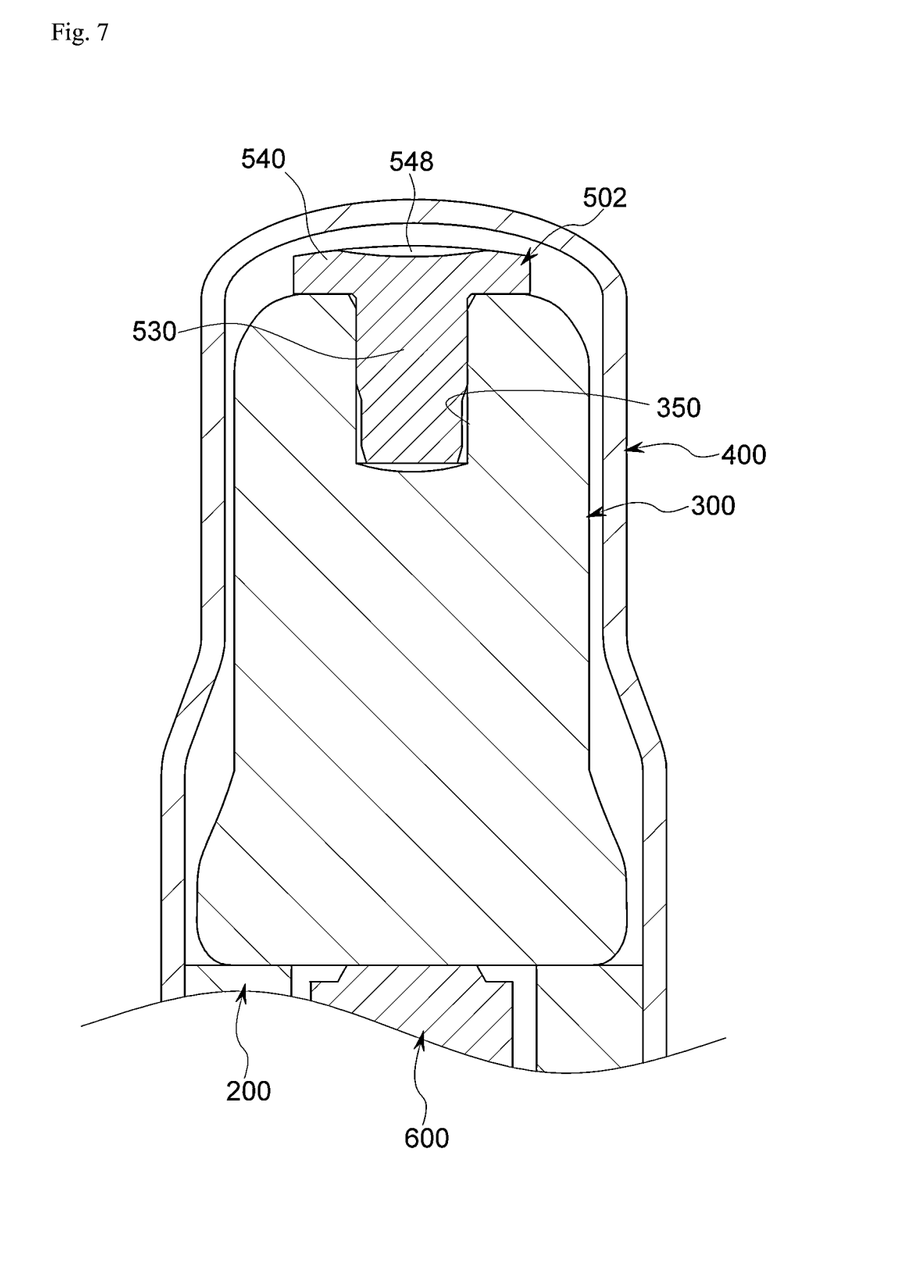
FIG. 7 is a cross-sectional view illustrating operating states of the armature and the noise reduction member in FIG. 5.

FIG. 5 illustrates a state in which the armature 300 is maximally moved upward, and FIG. 7 illustrates a state in which the armature 300 is maximally moved downward.

For example, in case that the solenoid valve 101 for a brake system is a normal open-type solenoid valve that is kept in an opened state at ordinary times, the armature 300 is in a state of being moved upward at ordinary times, as illustrated in FIG. 5.

As illustrated in FIG. 5, the damper portion 540 of the noise reduction member 502 is in contact with the sleeve 400 in a state in which the armature 300 is moved upward. As illustrated in FIG. 7, the damper portion 540 of the noise reduction member 502 is spaced apart from the sleeve 400 in a state in which the armature 300 is moved downward.

As illustrated in FIG. 7, when the armature 300 moves upward from the state in which the armature 300 is moved downward, the edge of the damper portion 540 of the noise reduction member 502 comes into contact with the sleeve 400, as illustrated in FIG. 5, thereby reducing noise and vibration.

In this case, the damper portion 540 of the noise reduction member 502 may be formed in a circular plate shape, and the edge of the damper portion 540 may come into contact with the sleeve 400. Therefore, when the sleeve 400 and the edge of the damper portion 540 of the noise reduction member 502 become close to each other as the armature 300 moves upward, the working fluid present in the space between the sleeve 400 and the damper portion 540 is discharged between the sleeve 400 and the edge of the damper portion 540. Therefore, a buffer effect increases as flow path resistance increases when an interval between the edge of the damper portion 540 and the sleeve 400 decreases. In this case, the working fluid, which fills the recessed region 548 of the damper portion 540, may further maximize the buffer effect.

As described above, the noise reduction member 502 and the solenoid valve 101 for a brake system with the same according to the second embodiment of the present disclosure may effectively reduce the occurrence of noise.

Hereinafter, a noise reduction member 503 and a solenoid valve 101 for a brake system according to a third embodiment of the present disclosure will be described with reference to FIGS. 8 to 10.

Figure 8:
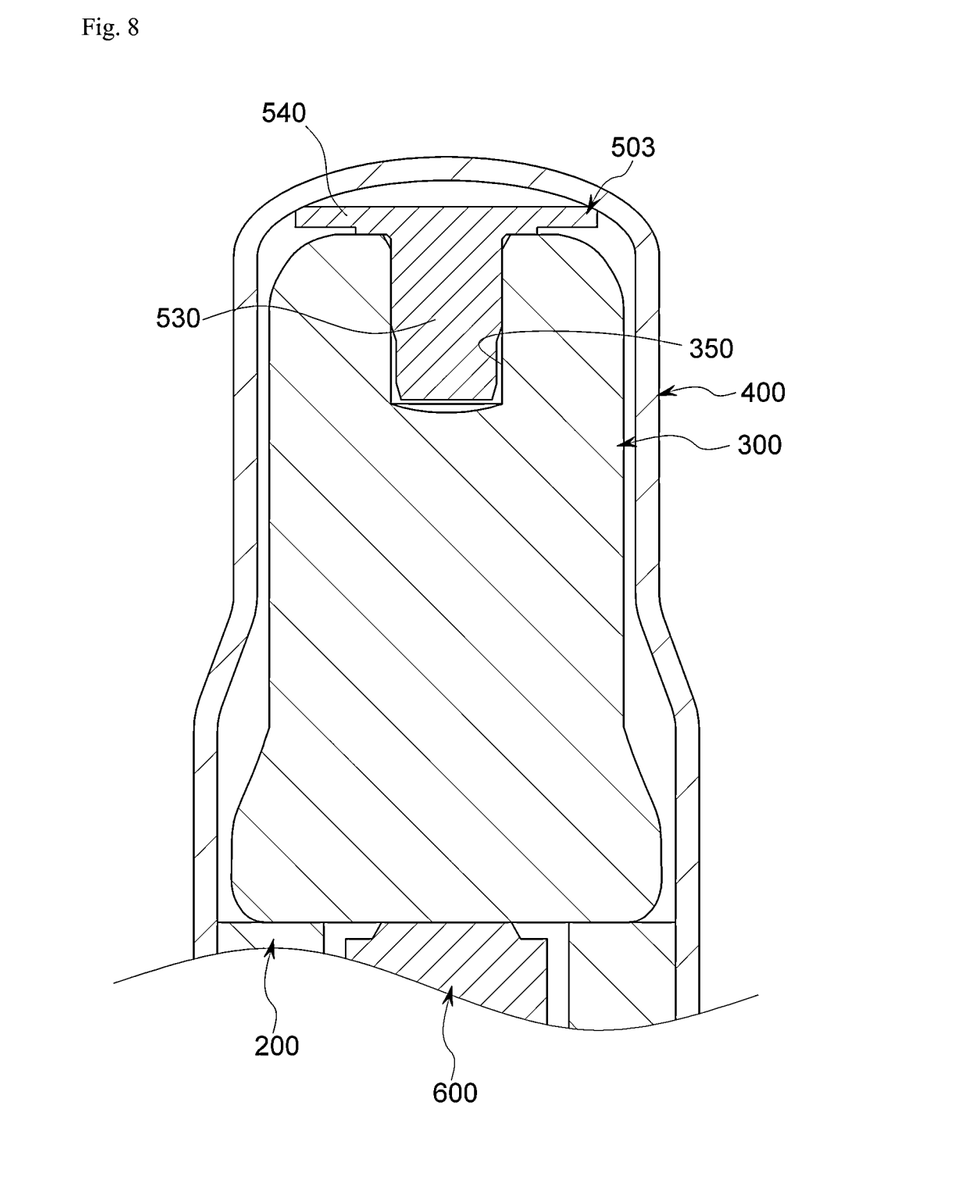
FIG. 8 is an enlarged cross-sectional view illustrating an armature, a noise reduction member, and a solenoid valve for a brake system with the same according to a third embodiment of the present disclosure.
Figure 9:
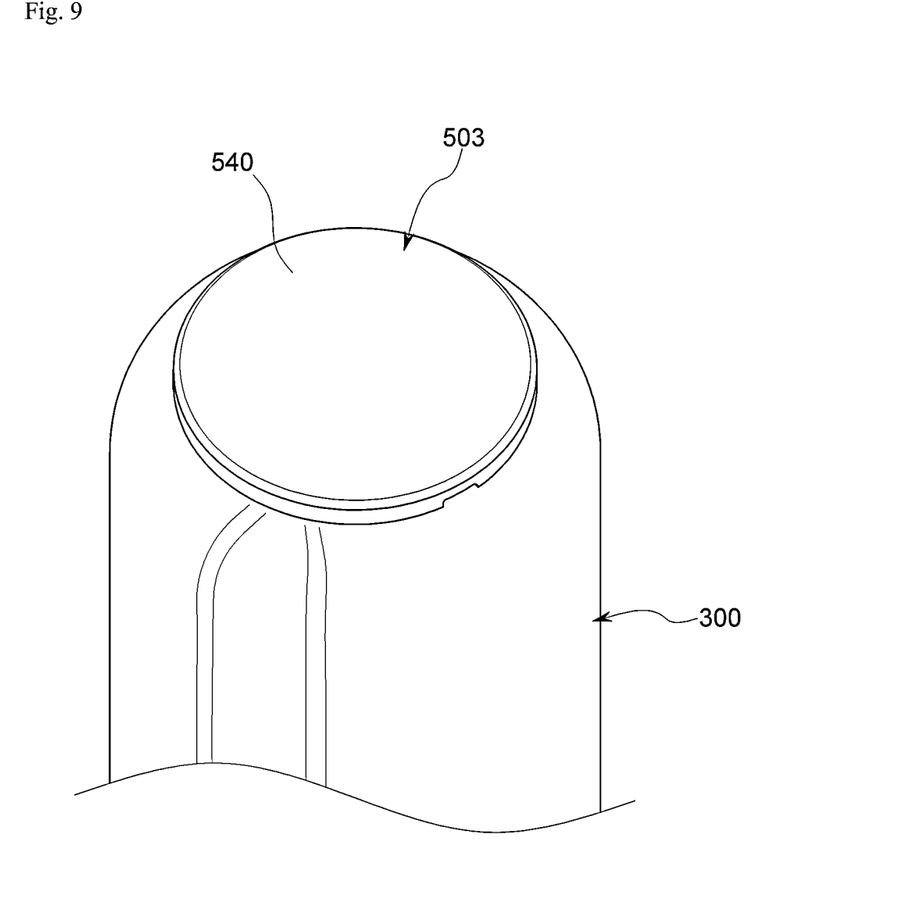
FIG. 9 is an enlarged perspective view illustrating the armature and the noise reduction member in FIG. 8.

As illustrated in FIGS. 8 and 9, in the second embodiment of the present disclosure, the edge of the damper portion 540 having the circular plate shape of the noise reduction member 503 comes into contact with the sleeve 400 when the armature 300 moves upward. In the state in which the armature 300 is moved downward, the edge of the damper portion 540 of the noise reduction member 503 may be spaced apart from the armature 300. Further, the edge of the damper portion 540 of the noise reduction member 503, which is spaced apart from the armature 300, may come into contact with the armature 300 as the edge of the damper portion 540 of the noise reduction member 503 is deformed by colliding with the sleeve 400 when the armature 300 moves upward.

Meanwhile, in the first embodiment, the discharge flow path 546 formed in one surface of the damper portion 540, which faces the sleeve 400, may be excluded.

Therefore, according to the third embodiment of the present disclosure, it is possible to obtain an additional effect of reducing noise and vibration as well as a noise and vibration reducing effect that may be obtained when the edge of the damper portion 540 having the circular plate shape of the noise reduction member 503 comes into contact with the sleeve 400.

Specifically, according to the third embodiment of the present disclosure, when the edge of the damper portion 540 of the noise reduction member 503 collides with the sleeve 400 as the armature 300 moves upward, the edge of the damper portion 540 absorbs impact by being deformed, thereby generating the effect of reducing additional noise and vibration. Further, when the armature 300 moves downward, the damper portion 540 of the noise reduction member 503 is restored in shape by its own elasticity, such that the edge of the damper portion is spaced apart from the armature 300.

With the above-mentioned configuration, the noise reduction member 503 and the solenoid valve 101 for a brake system with the same according to the third embodiment of the present disclosure may effectively reduce the occurrence of noise.

Specifically, when the armature 300 moves upward, the edge of the damper portion 540 having the circular plate shape of the noise reduction member 501 comes into contact with the sleeve 400, such that it is possible to obtain an effect of reducing noise by increasing a contact area as well as an effect of reducing noise by spacing the contact point between the damper portion 540 of the noise reduction member 501 and the sleeve 400 apart from the upward/downward movement axis. Further, it is possible to obtain the further improved noise and vibration reducing effect as the noise reduction member 503 absorbs impact by being deformed.

Hereinafter, operating states of the noise reduction member 503 and the solenoid valve 101 for a brake system with the same according to the third embodiment of the present disclosure will be described with reference to FIGS. 8 and 10.

Figure 10:
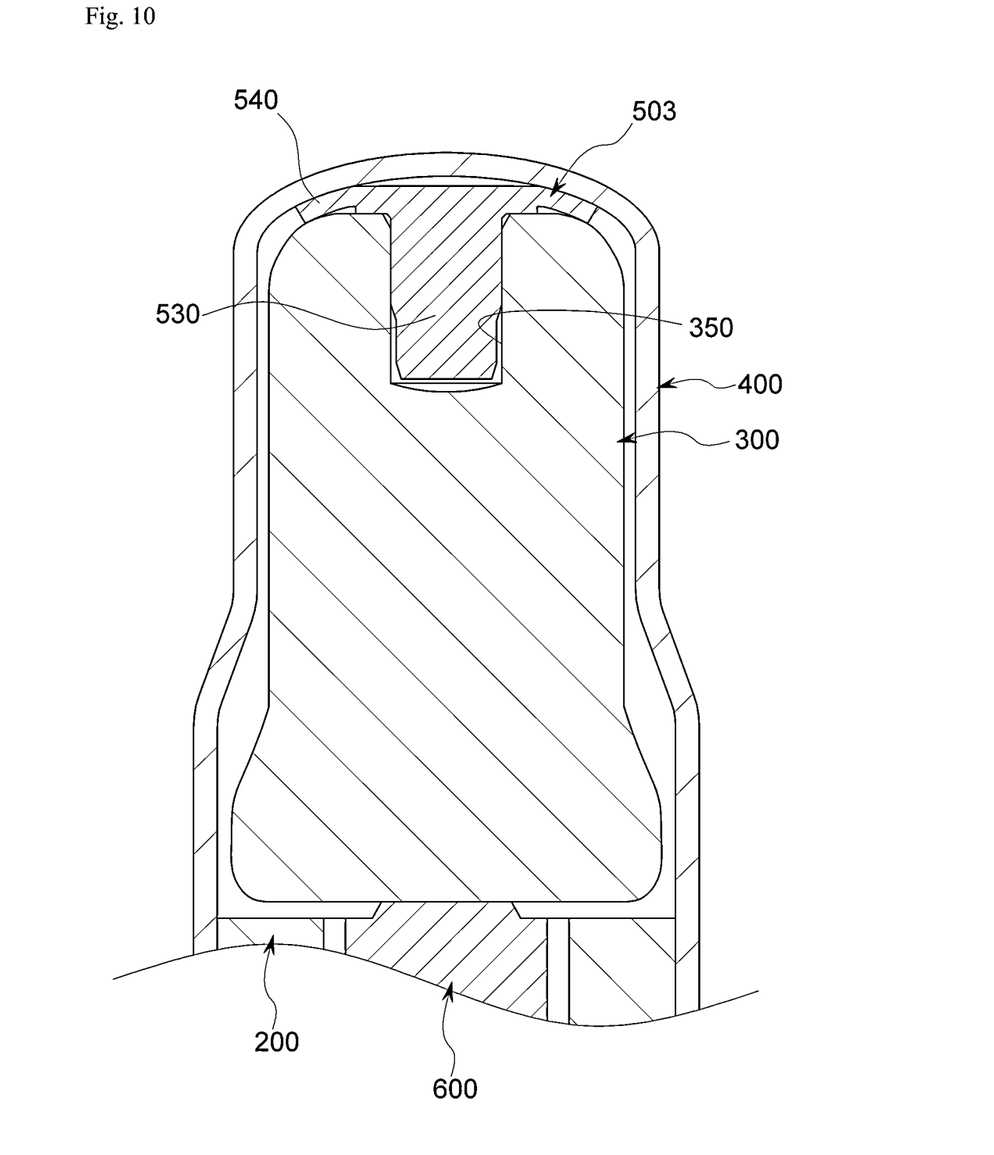
FIG. 10 is a cross-sectional view illustrating operating states of the armature and the noise reduction member in FIG. 8.

FIG. 8 illustrates a state in which the armature 300 is maximally moved downward, and FIG. 10 illustrates a state in which the armature 300 is maximally moved upward.

For example, in case that the solenoid valve 101 for a brake system is a normal open-type solenoid valve that is kept in an opened state at ordinary times, the armature 300 is in a state of being moved upward at ordinary times, as illustrated in FIG. 10.

As illustrated in FIG. 8, in the state in which the armature 300 is moved downward, the edge of the damper portion 540 of the noise reduction member 503 is spaced apart from the armature 300. As illustrated in FIG. 10, when the armature 300 moves upward, the edge of the damper portion 540 of the noise reduction member 503 comes into contact with the armature 300 by being deformed by a collision with the sleeve 400.

In this case, the damper portion 540 of the noise reduction member 503 is formed in a circular plate shape, the edge of the damper portion comes into contact with the sleeve 400, and the edge of the damper portion 540 absorbs impact by being deformed, thereby reducing noise and vibration.

When the armature 300 moves downward again from the state in which the armature 300 is moved upward, the damper portion 540 of the noise reduction member 503 is restored in shape by its own elasticity, such that the edge of the damper portion 540 may be spaced apart from the armature 300.

As described above, the noise reduction member 503 and the solenoid valve 101 for a brake system with the same according to the third embodiment of the present disclosure may effectively reduce the occurrence of noise.

While the embodiments of the present disclosure have been described with reference to the accompanying drawings, those skilled in the art will understand that the present disclosure may be carried out in any other specific form without changing the technical spirit or an essential feature thereof.

Accordingly, it should be understood that the aforementioned embodiments are described for illustration in all aspects and are not limited, and the scope of the present disclosure shall be represented by the claims to be described below, and it should be construed that all of the changes or modified forms induced from the meaning and the scope of the claims, and an equivalent concept thereto are included in the scope of the present disclosure.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. A noise reduction member, which is interposed between a sleeve including a cylindrical shape and an armature provided in the sleeve so as to be movable upward or downward, the noise reduction member being configured to reduce noise that occurs in the event of a collision between the sleeve and the armature, the noise reduction member comprising:
   a support portion accommodated and supported in the armature; and
   a damper portion having a circular plate shape and protruding and extending from the support portion toward the sleeve, wherein the damper portion has a discharge flow path formed along a surface of the damper portion facing the sleeve and more recessed than a flat surface positioned at a center of the damper portion and facing the sleeve.

2. The noise reduction member of claim 1, wherein an edge of the damper portion having the circular plate shape comes into contact with the sleeve when the armature moves upward.

3. The noise reduction member of claim 2, wherein the discharge flow path is formed in one surface of the damper portion, which faces the sleeve, so that a working fluid in a space between the damper portion and the sleeve is discharged when the damper portion and the sleeve come into contact with each other.

4. The noise reduction member of claim 2, wherein a central region, which is disposed inside the edge of the damper portion that comes into contact with the sleeve when the armature moves upward, is recessed in a direction away from the sleeve.

5. The noise reduction member of claim 4, wherein the working fluid present in the space between the damper portion and the sleeve is discharged between the edge of the damper portion and the sleeve when the armature moves upward, and
   wherein a buffer effect increases when flow path resistance increases as an interval between the edge of the damper portion and the sleeve decreases.

6. The noise reduction member of claim 2, wherein the edge of the damper portion is spaced apart from the armature based on a state in which the armature is moved downward.

7. The noise reduction member of claim 6, wherein the edge of the damper portion, which is spaced apart from the armature, comes into contact with the armature by being deformed by a collision between the edge of the damper portion and the sleeve when the armature moves upward.

8. The noise reduction member of claim 1, wherein the noise reduction member is made of polyether ether ketone (PEEK).

9. A solenoid valve for a brake system, the solenoid valve comprising:
   a valve core having an inlet and an outlet;
   a sleeve including a cylindrical shape coupled to one side of the valve core;
   an armature provided in the sleeve so as to be movable upward or downward;
   a plunger provided in the valve core and configured to open or close the inlet of the valve core in accordance with an upward or downward movement of the armature; and
   a noise reduction member accommodated in the armature and configured to reduce noise that occurs because of impact by the sleeve when the armature moves upward or downward,
   wherein the noise reduction member comprises:
   a support portion accommodated and supported in the armature; and
   a damper portion having a circular plate shape and protruding and extending from the support portion toward the sleeve, wherein the damper portion has a discharge flow path formed along a surface of the damper portion facing the sleeve and more recessed than a flat surface positioned at a center of the damper portion and facing the sleeve.

10. The solenoid valve of claim 9, wherein the noise reduction member is configured such that an edge of the damper portion having the circular plate shape comes into contact with the sleeve when the armature moves upward.

11. The solenoid valve of claim 9, wherein one surface of the sleeve, which faces the armature based on a direction in which the armature moves upward or downward, is formed in a shape convexly curved in a direction opposite to a direction in which the sleeve faces the armature.

12. The solenoid valve of claim 10, wherein the discharge flow path is formed in one surface of the damper portion, which faces the sleeve, so that a working fluid in a space between the damper portion and the sleeve is discharged when the damper portion and the sleeve come into contact with each other.

13. The solenoid valve of claim 10, wherein a central region, which is disposed inside the edge of the damper portion that comes into contact with the sleeve when the armature moves upward, is recessed in a direction away from the sleeve,
- wherein the working fluid present in the space between the damper portion and the sleeve is discharged between the edge of the damper portion and the sleeve when the armature moves upward, and
- wherein a buffer effect increases when flow path resistance increases as an interval between the edge of the damper portion and the sleeve decreases.

14. The solenoid valve of claim 10, wherein the edge of the damper portion is spaced apart from the armature based on a state in which the armature is moved downward, and
- wherein the edge of the damper portion, which is spaced apart from the armature, comes into contact with the armature by being deformed by a collision between the edge of the damper portion and the sleeve when the armature moves upward.

15. The solenoid valve of claim 9, wherein the noise reduction member is made of polyether ether ketone (PEEK).

16. The solenoid valve of claim 9, wherein a noise reduction member accommodation groove is formed at one end of the armature to accommodate the noise reduction member, and the support portion of the noise reduction member is accommodated in the noise reduction member accommodation groove.

17. The solenoid valve of claim 9, wherein the damper portion of the noise reduction member is spaced apart from the sleeve in a state in which the armature is maximally moved downward.

18. The solenoid valve of claim 9, further comprising:
- a valve seat installed in the inlet of the valve core and having an orifice,
- wherein the plunger opens or closes the orifice of the valve seat.

19. The solenoid valve of claim 9, further comprising:
- a restoring spring installed in the valve core and configured to elastically press the plunger in a direction in which the plunger opens the inlet of the valve core.

* * * * *